(12) United States Patent
Miura et al.

(10) Patent No.: US 8,678,146 B2
(45) Date of Patent: Mar. 25, 2014

(54) DISK BRAKE

(75) Inventors: Yorihito Miura, Minami Alps (JP); Shinichi Nakayama, Minami Alps (JP); Katsuhiro Takahashi, Minami Alps (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 416 days.

(21) Appl. No.: 13/072,982

(22) Filed: Mar. 28, 2011

(65) Prior Publication Data

US 2011/0290597 A1 Dec. 1, 2011

(30) Foreign Application Priority Data

May 31, 2010 (JP) .................................. P2010-125196

(51) Int. Cl.
*F16D 65/14* (2006.01)
(52) U.S. Cl.
USPC ........................................ 188/73.41; 188/72.9
(58) Field of Classification Search
CPC ............ F16D 2125/64; F16D 2121/14; F16D 65/567; F16D 2125/60
USPC ......... 188/73.41, 72.9, 71.1, 72.1, 72.4, 72.6, 188/2 D
See application file for complete search history.

(56) References Cited

U.S. PATENT DOCUMENTS

| | | | | | |
|---|---|---|---|---|---|
| 3,258,090 | A | * | 6/1966 | Hodkinson | 188/72.9 |
| 3,294,200 | A | * | 12/1966 | Hodkinson | 188/71.9 |
| 6,223,867 | B1 | * | 5/2001 | Doi et al. | 188/73.45 |

FOREIGN PATENT DOCUMENTS

| | | | | | |
|---|---|---|---|---|---|
| JP | 01261523 | A | * | 10/1989 | ............. F16D 65/30 |
| JP | 2005291277 | | | 10/2005 | |

* cited by examiner

*Primary Examiner* — Xuan Lan Nguyen
(74) *Attorney, Agent, or Firm* — Nixon & Vanderhye P.C.

(57) ABSTRACT

Provided is a disk brake having a caliper. The caliper includes a cylinder part disposed at one side in a disk axial direction and having a bore for accommodating a piston, a pair of arm parts extending to both sides of the cylinder part in a disk rotational direction and having ends to which sliding pins are fixed, and a guide attachment part configured to couple the one arm part to the cylinder part and to which a cable guide member is fixed, which are integrally formed with each other. A thickness of the guide attachment part in a disk diameter direction and a thickness of the one arm part in the disk diameter direction at least partially overlap in the disk axial direction.

20 Claims, 10 Drawing Sheets

DISK BRAKE

BACKGROUND OF THE INVENTION

1. Field of the Invention

The present invention relates to a disk brake.

Priority is claimed on Japanese Patent Application No. 2010-125196 filed on May 31, 2010, the content of which is incorporated herein by reference.

2. Description of Related Art

A caliper having a parking brake mechanism includes a cable guide member configured to hook a cable including a wire for pulling a lever (For example, Japanese Unexamined Patent Application, First Publication No.: 2005-291277). A guide attachment part configured to attach the cable guide member to the caliper is integrally formed with the caliper when the caliper is cast.

The guide attachment part projects from the caliper. Therefore, the guide attachment part may be rapidly coagulated when the caliper is cast, and the molten metal fluidity may be deteriorated, degrading the formability of the caliper.

SUMMARY OF THE INVENTION

An object of the present invention is to provide a disk brake capable of improving the formability of a caliper.

According to a first aspect of the present invention, a disk brake includes: a caliper slidably supported at an attachment member by sliding pins inserted into guide holes formed in the attachment member fixed to a non-rotation part of a vehicle; a piston disposed in the caliper and configured to press at least a pair of friction pads against a disk; a parking brake mechanism disposed in the caliper to move the piston; a lever member configured to transmit a force from a wire to the parking brake mechanism; and a cable guide member integrally attached to an outer side of the caliper and configured to hook a cable including the wire.

The caliper includes: a cylinder part disposed at one side in a disk axial direction and having a bore for accommodating the piston; a pair of arm parts extending to both sides of the cylinder part in a disk rotational direction and having ends to which the sliding pins are fixed; and a guide attachment part configured to connect one arm part of the pair of arm parts to the cylinder part and to which the cable guide member is fixed, which are integrally formed with each other, and a thickness of the guide attachment part in a disk diameter direction and a thickness of the one arm part in the disk diameter direction at least partially overlap in the disk axial direction.

According to a second aspect of the present invention, a disk brake includes: a caliper slidably supported at an attachment member fixed to a non-rotation part of a vehicle and having a piston disposed therein to press a friction pad against a disk; a parking brake mechanism disposed in the caliper to move the piston; and a cable guide member attached to an outer side of the caliper and configured to hook a cable including a wire for transmitting a force to the parking brake mechanism.

The caliper includes: a cylinder part disposed at one side in a disk axial direction and having a bore for accommodating the piston; a pair of arm parts extending to both sides of the cylinder part in a disk rotational direction, and having sliding parts formed at ends thereof and moving with respect to the attachment part; and a guide attachment part configured to couple one arm part of the pair of arm parts to the cylinder part and to which the cable guide member is fixed, which are integrally formed of an aluminum alloy through casting.

According to a third aspect of the present invention, a disk brake has a caliper slidably supported at an attachment member by sliding pins inserted into guide holes formed in the attachment member fixed to a non-rotation part of a vehicle, and to which a cable guide member configured to hook a cable including a wire for transmitting a force to a parking brake mechanism to move a piston.

The caliper includes: a cylinder part disposed at one side in a disk axial direction and having a bore for accommodating the piston; a pair of arm parts extending to both sides of the cylinder part in a disk rotational direction and having ends to which the sliding pins are fixed; and a guide attachment part configured to connect one arm part of the pair of arm parts that becomes a disk rotational outlet side when the vehicles moves forward to the cylinder part and to which the cable guide member is fixed, which are integrally formed with each other.

The one arm part may be an arm part having a large clearance between the guide hole and the sliding pin.

The one arm part may be an arm part that becomes the disk rotational outlet side when the vehicle moves forward.

¼ or more of the thickness of the guide attachment part in the disk diameter direction may overlap the one arm part.

An adhesion dimension of the guide attachment part with the one arm part in the disk rotational direction may be equal to or less than ½ of a dimension of the one arm part in the disk rotational direction.

A boss part having an introduction hole for introducing a brake liquid into the caliper may be formed at the cylinder part of the caliper, and the guide attachment part may be coupled to the boss part.

The caliper may be integrally formed of an aluminum alloy through casting.

According to the aspects of the present invention, it is possible to improve the formability of the caliper.

DETAILED DESCRIPTION OF THE INVENTION

Hereinafter, an embodiment of the present invention will be described with reference to the accompanying drawings. A disk brake 10 in accordance with an embodiment shown in FIGS. 1 to 5 includes a carrier (an attachment member) 11, a pair of friction pads 12, and a caliper 13.

Figure 1:
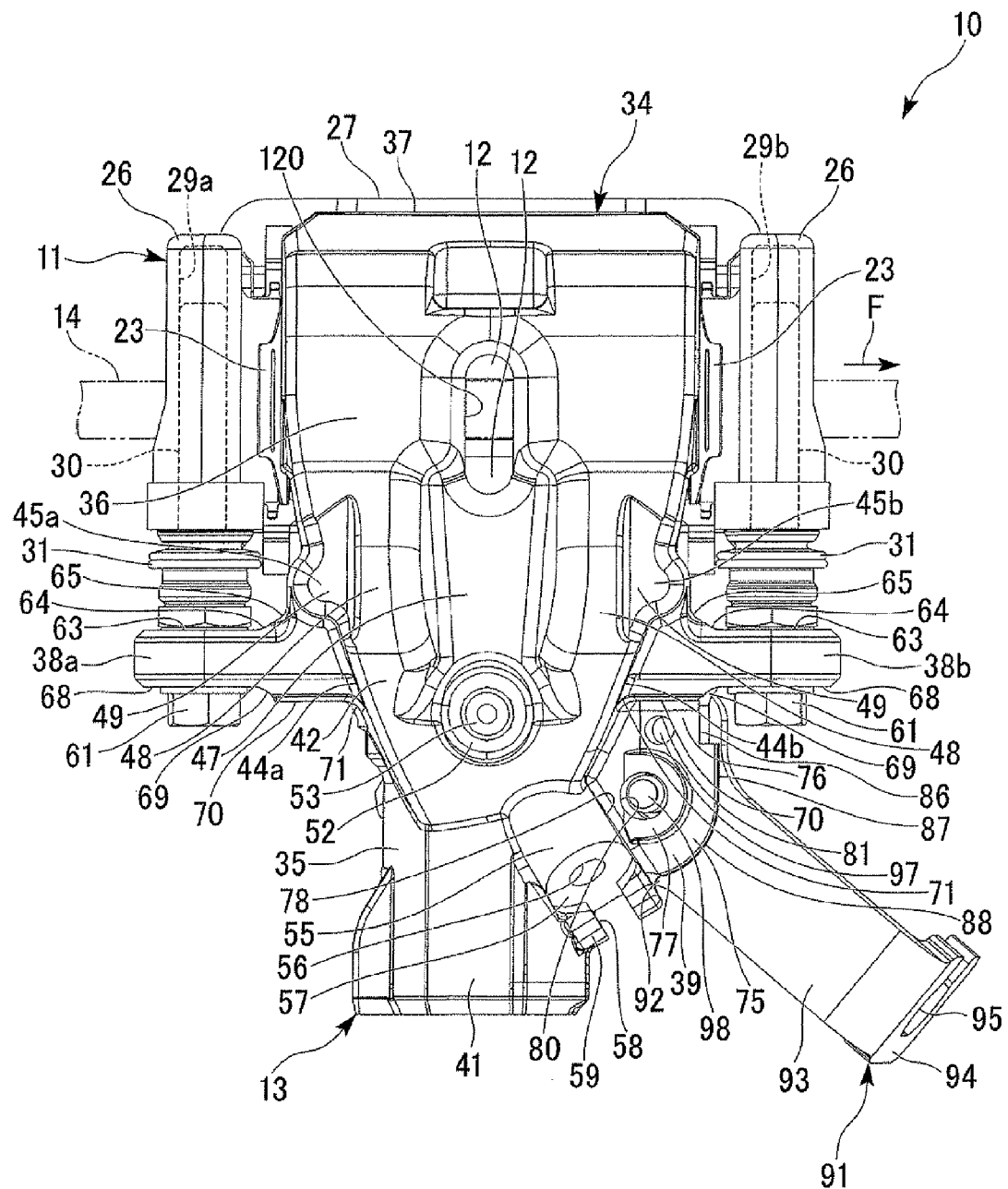
FIG. 1 is a plan view showing a disk brake in accordance with an embodiment of the present invention.
Figure 2:
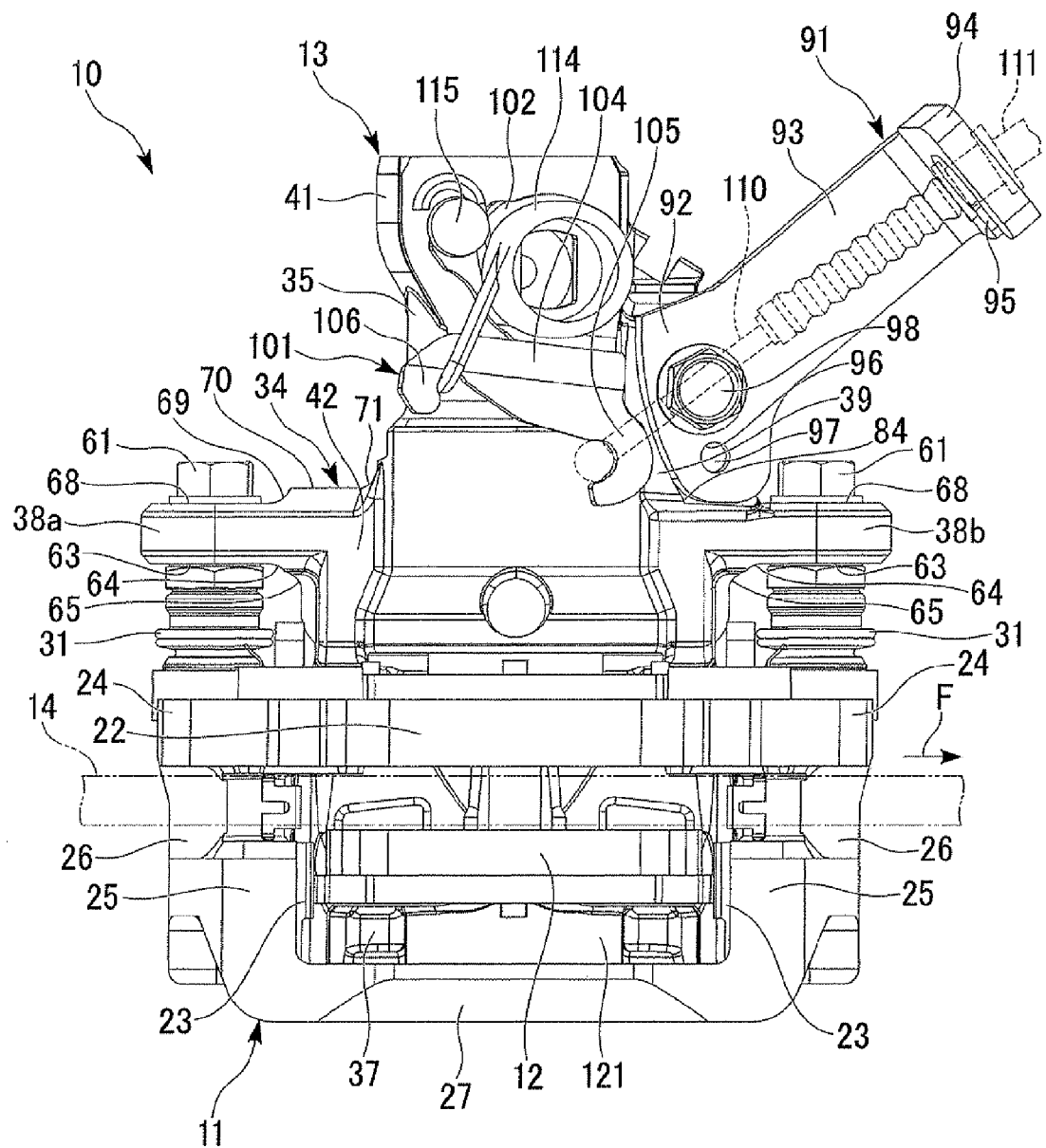
FIG. 2 is a bottom view showing the disk brake in accordance with the embodiment of the present invention.

As shown in FIGS. 1 and 2, the carrier 11 is disposed to be astride an outer diameter side of a disk 14 rotated with a wheel (not shown), which is to be braked, and fixed to a non-rotation part of a vehicle (not shown). The pair of friction pads 12 are disposed on both sides of the disk 14 via the disk 14. The friction pads 12 are supported by the carrier 11 to be slidable in an axial direction of the disk 14 in a state in which the friction pads 12 are disposed at both surfaces of the disk 14 to oppose each other. The caliper 13 is supported by the carrier 11 to be slidable in the axial direction of the disk 14 in a state in which the caliper 13 is astride the outer diameter side of the disk 14. The caliper 13 presses the friction pads 12 against the disk 14 to apply a friction resistance to the disk 14. Hereinafter, a diametrical direction of the disk 14 is referred to as a disk diameter direction, an axial direction of the disk 14 is referred to as a disk axial direction, and a rotational direction of the disk 14 is referred to as a disk rotational direction. In addition, the disk rotational direction upon forward movement of a vehicle is shown as an arrow F in the drawings. An inlet side of the disk rotational direction is referred to as a disk rotational inlet side, and an outlet side of the disk rotational direction is referred to as a disk rotational outlet side.

Figure 3:
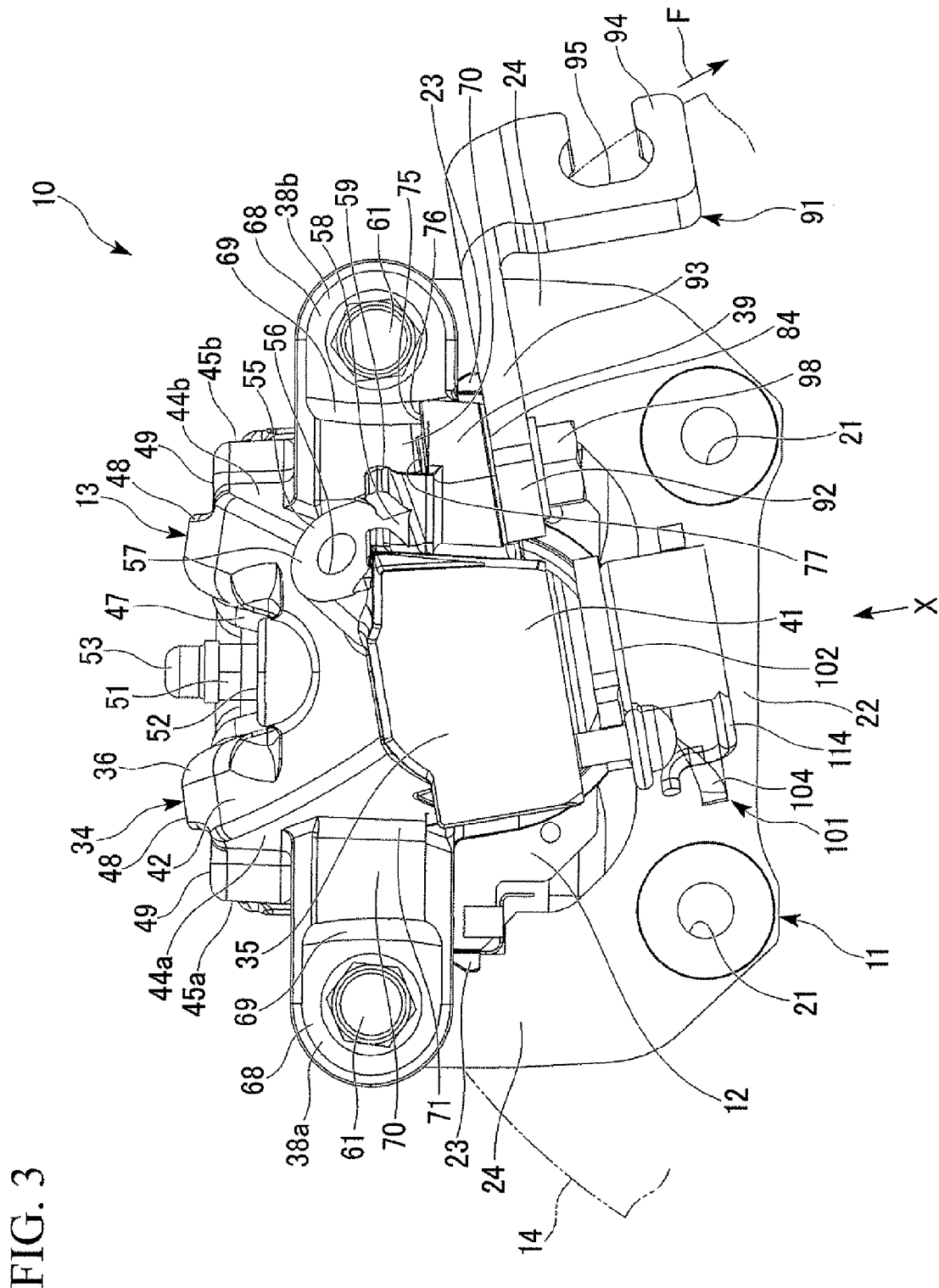
FIG. 3 is a rear view showing the disk brake in accordance with the embodiment of the present invention.

The carrier 11 includes a base plate 22 having an attachment hole 21 through which the base plate 22 is attached to a vehicle, a pair of inner-side pad support parts 24 configured to slidably support the inner-side friction pad 12 through a pair of pad guides 23, as shown in FIG. 3, a pair of outer-side pad support parts 25 configured to slidably support the outer-side friction pad 12 through the pair of pad guides 23, a pair of connecting parts 26 extending in the disk axial direction to connect the inner-side pad support parts 24 to the outer-side pad support parts 25, and a beam part 27 configured to connect the pair of outer-side pad support parts 25 to each other, as shown in FIG. 2, which are integrally formed with each other.

As shown in FIG. 1, guide holes 29a and 29b are formed in the carrier 11 at positions of the pair of connecting parts 26 outside the disk diameter direction at both ends in the disk rotational direction along the disk axial direction opposite to the beam part 27. Sliding pins 30 are slidably inserted into the guide holes 29a and 29b from inner sides thereof to be slidable in the disk axial direction. The caliper 13 is supported at the carrier 11 by the sliding pins 30. Portions of the pair of sliding pins 30 between the caliper 13 and the carrier 11 are each coated with flexible boots 31. In the embodiment, in the guide holes 29a and 29b, the guide hole 29a disposed at the disk rotational inlet side has a small clearance between the guide hole 29a and the sliding pin 30. The guide hole 29b disposed at the disk rotational outlet side has a clearance between the guide hole 29b and the sliding pin 30 larger than that between the guide hole 29a and the sliding pin 30. In addition, the clearances at the disk rotational inlet side and the disk rotational outlet side may be equal to each other.

Figure 4:
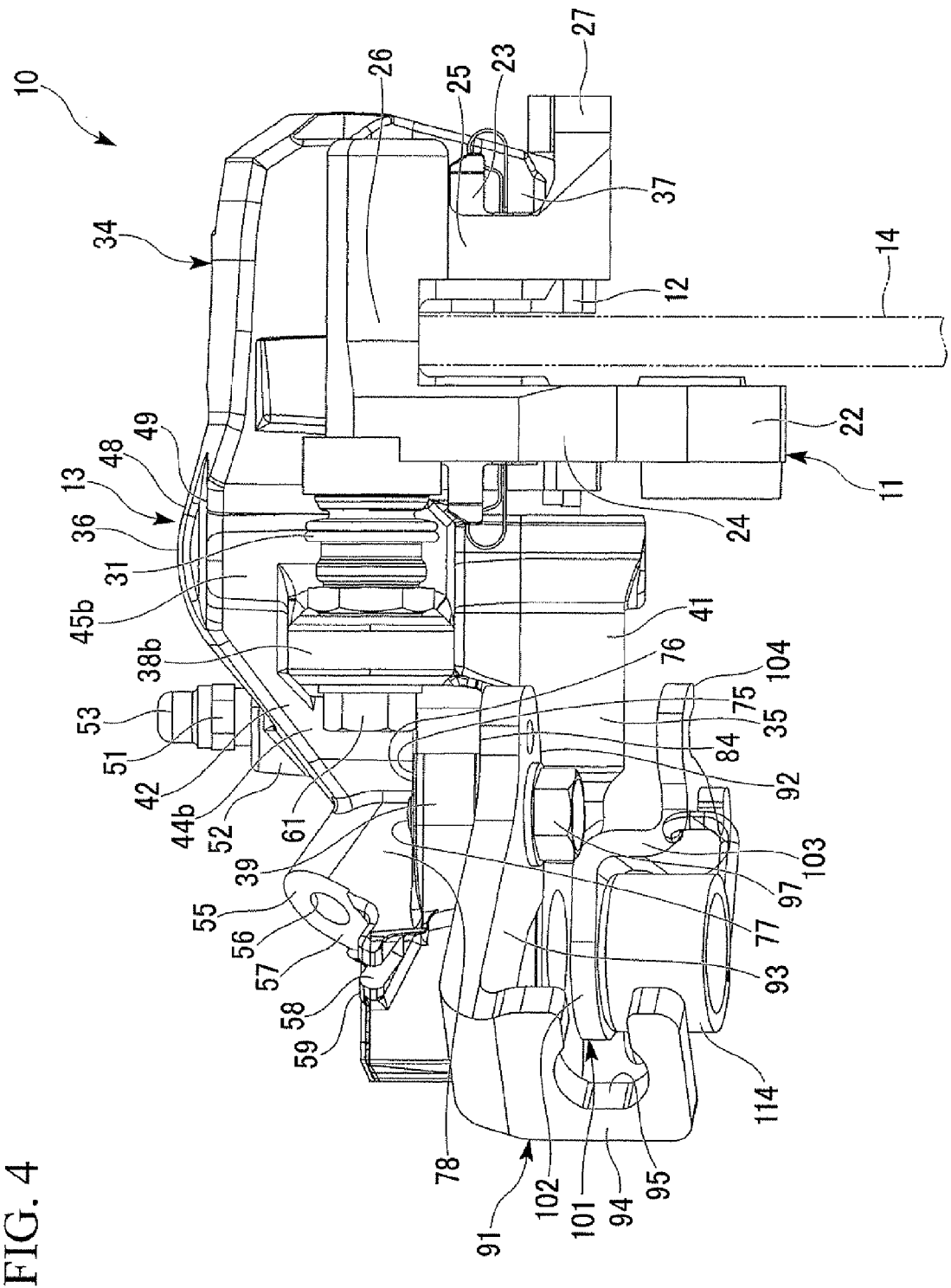
FIG. 4 is a side view showing the disk brake in accordance with the embodiment of the present invention.
Figure 5:
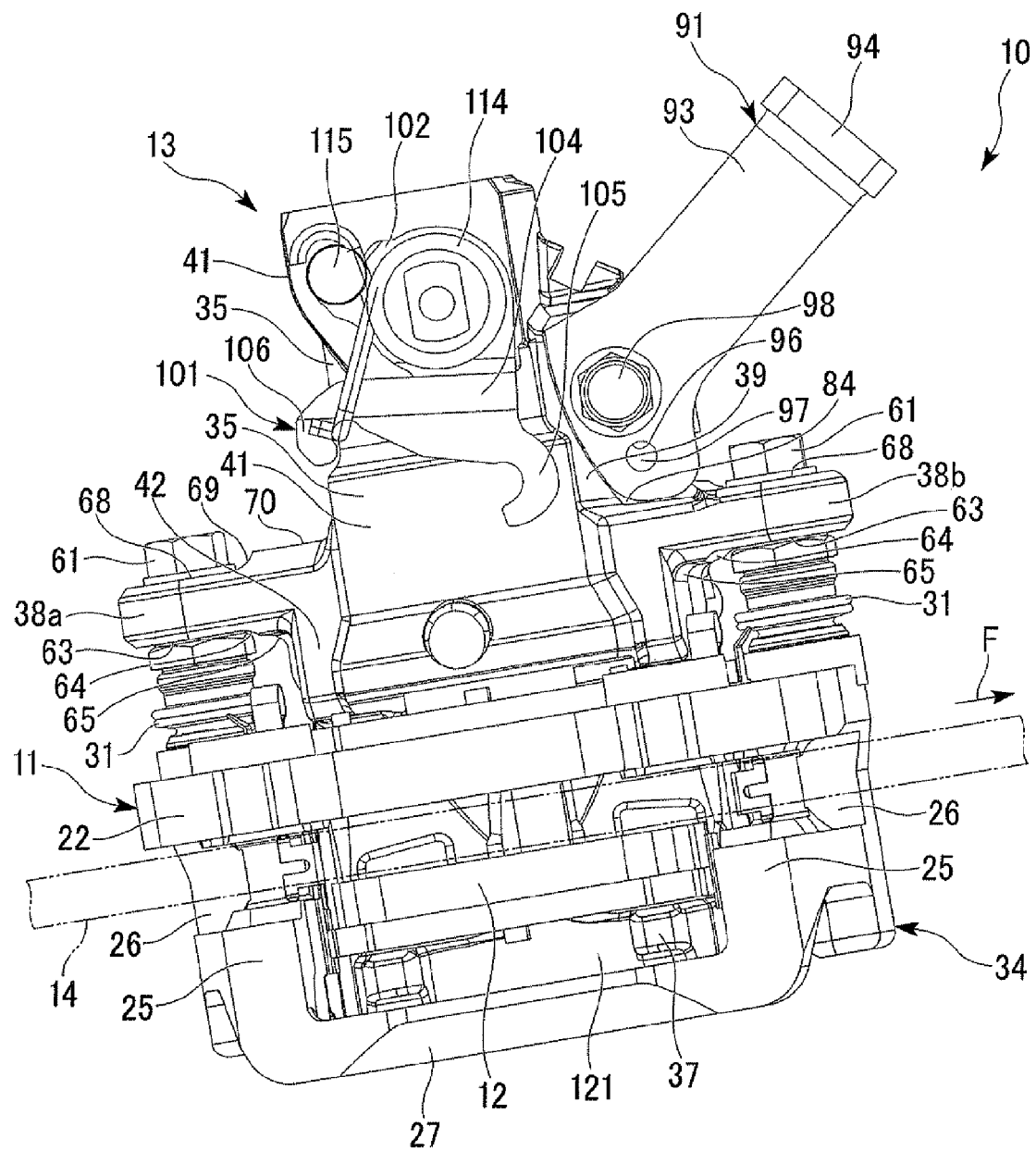
FIG. 5 is a view when seen from a direction indicated by an arrow X of FIG. 3.

The caliper 13, which is astride the disk 14, has a caliper body 34 supported at the carrier 11 through the sliding pin 30. The caliper body 34 includes a cylinder part 35, a bridge part 36, a claw part 37, as shown in FIG. 4, a pair of arm parts 38a and 38b, and a guide attachment part 39, as shown in FIG. 1, which are integrally formed with each other by casting an aluminum alloy. In the caliper body 34, the cylinder part 35 is disposed at one side in the axial direction. The claw part 37 is disposed at the other side in the axial direction of the disk 14. The bridge part 36 is disposed being astride the disk 14 so as to connect the claw part 37 to the cylinder part 35. The caliper 13 is referred to as a fist-type caliper.

The cylinder part 35 has a cylinder main body 41 extending in the disk axial direction, and a connecting contour part 42 formed at an upper part thereof from a middle position of the cylinder main body 41 in the disk axial direction to an end of the claw part 37. The connecting contour part 42 has a width in the disk rotational direction, which is increased as it approaches the claw part 37 in the disk axial direction. In addition, as shown in FIG. 4, the connecting contour part 42 is formed so as to be disposed outside the disk diameter direction, and an end of the connecting contour part 42 adjacent to the claw part 37 is connected to the bridge part 36 in a continuous shape. As shown in FIGS. 1 and 3, both of side surface parts 44a and 44b of the connecting contour part 42 in the disk rotational direction are formed along the disk diameter direction, and have a gap in the disk rotational direction, which is increased as it approaches the claw part 37 in the disk axial direction. As shown in FIG. 1, a pair of side convex parts 45a and 45b project outward from both of the side surface parts 44a and 44b in the disk rotational direction.

The cylinder part 35 has a concave part 47 formed in an outer surface of the connecting contour part 42 outside the disk diameter direction, disposed at a center position in the disk rotational direction, and extending to the bridge part 36 in the disk axial direction. As a result, outer surface convex parts 48 are formed at both surfaces of the concave part 47 in the disk rotational direction to project outward in the disk diameter direction and extend in the disk axial direction. In addition, concave parts 49 are formed in middle parts of both of the outer surface convex parts 48 in the disk axial direction, are disposed outside the disk rotational direction, and have a height in the disk diameter direction smaller than that of the convex parts 48. The side convex parts 45a and 45b are formed at positions of both of the concave parts 49.

In addition, as shown in FIG. 4, a seating part 52, with which a mouthpiece 51 for discharging air shown in FIG. 3 is threadedly engaged, is integrally formed in the cylinder part so as to project from the cylinder part 35 outward in the disk diameter direction to be opposite to the claw part 37 of the concave part 47 disposed in the middle thereof. A cap 53 is disposed outside the mouthpiece 51 to seal the mouthpiece 51.

Further, as shown in FIG. 1, the cylinder part 35 has a boss part 55 integrally formed at one side thereof in the disk rotational direction on a boundary between the connecting contour part 42 and the cylinder main body 41, specifically, at the disk rotational outlet side, so as to project toward one side in the disk rotational direction, outside the disk diameter direction and toward an opposite side of the claw part 37 in the disk axial direction.

An introduction hole 56 is formed in a center portion of the boss part 55 in parallel with a projecting direction of the boss part 55 to introduce a brake liquid into the cylinder part 35. In addition, projections 59 having notch parts 58 formed at center positions thereof are formed on a seat surface 57 which is disposed in an end of the boss part 55 in the projecting direction so as to be disposed inside the disk diameter direction, rather than the introduction hole 56. A mouthpiece of a hose (not shown) connected to the introduction hole 56 to introduce a brake liquid is disposed in the notch parts 58 of the projections 59. The projections 59 surround the mouthpiece from both sides thereof to be non-rotatably hooked.

The pair of arm parts 38a and 38b are formed extending from middle of the pair of side surface parts 44a and 44b of the connecting contour part 42 in the disk axial direction so as to be disposed adjacent to the side convex parts 45a and 45b in the disk axial direction and to oppose each other in the disk rotational direction. That is, the pair of arm parts 38a and 38b extend from a middle part of the cylinder part 35 of the caliper body 34 in the disk axial direction to both sides thereof in the disk rotational direction. The sliding pins 30 project from ends of the arm parts 38a and 38b in the disk axial direction to the claw part 37 to be fixed thereto. The sliding pins 30 are fixed to the arm parts 38a and 38b by bolts 61 threadedly engaged with the arm parts in an opposite direction of the projection direction.

A seat surface 63, a curved surface 64 and an extended surface 65 are formed at the pair of arm parts 38a and 38b adjacent to the claw part 37. The seat surface 63 is formed so as to be perpendicular to the disk axial direction in which the sliding pin 30 contacts distal end sides of the arm parts 38a and 38b in the projection direction. The curved surface 64 is formed so as to be curved from a proximal end sides of the seat surface 63 in the arm parts 38a and 38b toward an outside of the seat surface 63 in a vertical direction. The extended surface 65 is substantially continuously curved to the curved surface 64, and connected to outer ends of the adjacent side convex parts 45a and 45b in the disk rotational direction. A seat surface 68, a curved surface 69, a proximal end surface 70 and a curved surface 71 are formed at surfaces of the pair of arm parts 38a and 38b opposite to the claw part 37. The seat surface 68 is formed so as to crosses the disk axial direction in which the bolts 61 contact the distal ends of the arm parts 38a and 38b in the projection direction. The curved surface 69 is formed so as to be curved from the proximal end side of the seat surface 68 in the arm parts 38a and 38b toward an outer side of the seat surface 68 in a vertical direction. The proximal end surface 70 extends from the curved surface 69 opposite to the seat surface 68 in a direction parallel to the seat surface 68. The curved surface 71 is formed so as to be curved from the proximal end surface 70 opposite to the curved surface 69 in a vertical direction of the proximal end surface 70 to be connected to the side surface parts 44a and 44b.

The guide attachment part 39 is formed to project from one side in the disk rotational direction of both of the side surface parts 44a and 44b of the connecting contour part 42, specifically, the side surface part 44b of the disk rotational outlet side opposite to the claw part 37 in the disk axial direction, rather than the same side as the arm part 38b in the disk rotational direction. The guide attachment part 39 is configured to connect the connecting contour part 42, the cylinder main body 41, the boss part 55 and the one arm part 38b of the disk rotational outlet side. In addition, the one arm part 38b is disposed at the disk rotational outlet side. Accordingly, at a position at which the one arm part 38b is disposed, a clearance between the guide hole 29b and the sliding pin 30 is large.

The guide attachment part 39 has a connecting surface 76 and a risen part 77 formed at an outer surface 75 thereof in the disk diameter direction. The connecting surface 76 has an annular shape, and is connected from the cylinder part 35 to both sides of the one arm part 38b. The risen part 77 slightly projects from a middle position of the connecting surface 76 in a vertical direction of the connecting surface 76. The connecting surface 76 constitutes the entire range of a connecting part to the cylinder part 35 and the one arm part 38b of the outer surface 75 of the guide attachment part 39, and is connected to the cylinder part 35 and the one arm part 38b with no step difference along the entire range. Specifically, the connecting surface 76 is connected to the side surface part 44b on the side of the one arm part 38b of the connecting contour part 42 of the cylinder 35 and the proximal end surface 70 of the one arm part 38b with no step difference. In addition, the connecting surface 76 configures a connecting part to the boss part 55 of the cylinder part 35 in the outer surface 75 of the guide attachment part 39. The connecting surface 76 is continuously connected to the side surface part 44b on the side of the one arm part 38b of the connecting contour part 42, the proximal end surface 70 of the one arm part 38b, and a side surface 78 on the side of the one arm part 38b of the boss part 55 with no step difference. Accordingly, the guide attachment part 39 connects the one arm part 38b to the cylinder part 35, and is also connected to the boss part 55 of the cylinder part 35.

As shown in FIG. 3, the outer surface 75 is inclined in a direction that is not parallel to the direction in which the pair of arm parts 38a and 38b are connected, and is disposed outside the disk diameter direction as it goes outside the disk rotational direction. The connecting surface 76 of the outer surface 75 is connected to a lower middle position of the one arm part 38b in the disk diameter direction. Accordingly, as shown in FIG. 4, a thickness of the guide attachment part 39 in the disk diameter direction and a thickness of the one arm part 38b in the disk diameter direction at least partially overlap in the disk axial direction. In other words, the guide attachment part 39 and the one arm part 38b are configured to be connected to each other in the disk axial direction in a state in which the guide attachment part 39 and the one arm part 38b at least partially overlap in the disk diameter direction. As shown in FIG. 1, the guide attachment part 39 has a threaded hole 80 formed at a position of the risen part 77 to be substantially perpendicular to the outer surface 75. A pin hole 81 is formed between the risen part 77 and the one arm part 38b to be parallel to the threaded hole 80.

As shown in FIG. 3, the guide attachment part 39 has an inner surface 84 inside the disk diameter direction and the outer surface 75, whose extension lines are formed to cross each other. Accordingly, the inner surface 84 is inclined to be disposed outside the disk diameter direction to approach the one arm part 38b as it goes outside the disk rotational direction. The inner surface 84 is entirely disposed inside the disk diameter direction, rather than an inner end position of the one arm part 38b in the disk diameter direction.

As shown in FIG. 1, the guide attachment part 39 has a notch part 86 formed at a surface thereof adjacent to the arm part 38b outside the disk rotational direction. A flat surface 87 is formed at the notch part 86 opposite to the arm part 38b in a direction perpendicular to the arm part 38b and parallel to the disk diameter direction. A curved surface 88 is formed at the flat surface 87 opposite to the notch part 86 to be connected to the side surface 78 of the boss part 55. The notch part 86 is formed when the seat surface 68 of the arm part 38b is processed by cutting. A dent level of the notch part 86 is small compare to a width of the guide part 39 in the disk rotational direction. The notch part 86 is not formed along the length of the arm part 38b.

As shown in FIGS. 2 to 5, a cable guide member 91 is attached to the inner surface 84 of the guide attachment part 39. As shown in FIG. 2, the cable guide member 91 includes an attachment plate part 92 in contact with the inner surface 84, an extension plate part 93 extending from the attachment plate part 92 in the same plane, and a cable hook part 94 vertically bent from a front end of the extension plate part 93 inward in the disk diameter direction. The cable hook part 94 has a laterally opened hook groove 95. The attachment plate part 92 has a bolt insertion hole (not shown) and a pin hole 96. The cable guide member 91 is positioned at the guide attachment part 39 and fixed thereto by the pin hole 96 of the attachment plate part 92 and a pin 97 fitted into a pin hole 81 of the guide attachment part 39 shown in FIG. 1, and a bolt 98 threadedly engaged with the threaded hole 80 of the guide attachment part 39 via a bolt insertion hole (not shown) of the attachment plate part 92, in a state in which the attachment plate part 92 is in contact with the inner surface 84. Accordingly, the cable guide member 91 is integrally attached to an outer side of the caliper 13 and extends to be opposite to the disk rotational outlet side and the claw part 37 of the disk axial direction.

As shown in FIGS. 2 to 5, a lever member 101 is rotatably installed at a lower side of the cylinder main body 41. As shown in FIG. 4, the lever member 101 includes a contact plate part 102 in contact with a lower surface of the cylinder main body 41, an extension plate part 103 extending from an edge of the contact plate part 102 adjacent to the claw part 37 inward in the disk diameter direction, and an input plate part 104 extending from an edge of the extension plate part 103 opposite to the contact plate part 102 in a direction substantially parallel to the extension plate part 103 toward a side of the claw part 37. As shown in FIG. 2, the input plate part 104 has a wire hook part 105 formed adjacent to the cable guide member 91 in the disk rotational direction. The input plate part 104 has a spring hook part 106 having a hook shape formed at an opposite side of the cable guide member 91 in the disk rotational direction.

One end of a tubular cable 111 including a wire 110 is hooked by the cable hook part 94 of the cable guide member 91. An end of the wire 110 extending from the cable 111 is hooked by the wire hook part 105 of the lever member 101. Accordingly, as the wire 110 is pulled away from the lever member 101, the lever member 101 is rotated. One end of the torsion spring 114 is hooked by the spring hook part 106 of the lever member 101. The other end of the torsion spring 114 is hooked by a hook pin 115 fixed to the lower surface of the cylinder main body 41. Accordingly, the lever member 101 is rotated in a direction in which the torsion spring 114 extracts the wire 110 from the cable 111.

As shown in FIG. 1, the bridge part 36 is formed at the caliper body 34 to be connected to the connecting contour part 42 on a side closer to the claw part 37 than the arm parts 38a and 38b. The bridge part 36 has a substantial plate shape curved along the outer circumference of the disk 14. A window part 120 is formed at a center position of the bridge part 36 in the disk rotational direction to pass through the bridge part 36 in the disk diameter direction. The window part 120 is used to check a wear status of the pair of friction pads 12 by a visual observation.

The claw part 37 is formed at the caliper body 34 adjacent to the bridge part 36 opposite to the cylinder part 35. As shown in FIG. 4, the claw part 37 is formed to extend inward in the disk diameter direction. As shown in FIG. 2, the claw part 37 is provided with a recess 121 through which a tool for machining the cylinder part 35 is inserted. The recess 121 is recessed in a substantially semicircular shape and passes through in the disk axial direction.

Here, as shown in FIGS. 6 to 9, a casting material 34' of the caliper body 34 formed of an aluminum alloy through casting is configured form the cylinder part 35, the bridge part 36 including the boss part 55, the claw part 37, the pair of arm parts 38a and 38b, and the guide attachment part 39, which are integrally formed with each other. While not shown, a pouring gate is formed at the mold, which is used when the casting material 34' is cast, to be disposed at a rear surface of the cylinder part 35 opposite to the claw part 37. A molten metal is injected into a cavity from the pouring gate in the disk axial direction. Then, the molten metal partially flows from the cylinder part 35, passes through the guide attachment part 39 and the pair of arm parts 38a and 38b, and flows toward the bridge part 36 and the claw part 37.

In the casting material 34', the seat surface 63 and the curved surface 64, and the seat surface 68 and the curved surface 69 shown in FIG. 1 are formed at the pair of arm parts 38a and 38b through machining. The extension surface 65 connected to the adjacent side convex parts 45a and 45b, the proximal end surface 70 connected to the outer surface 75 of the guide attachment part 39, the curved surface 71, and so on, are formed during the casting. In the guide attachment part 39, the notch part 86, the pin hole 81 and the threaded hole 80 are formed in the casting material 34' through machining. The connecting surface 76 and the risen part 77 of the outer surface 75 of the guide attachment part 39 are formed during the casting. The seat surface 57, the introduction hole 56 and the notch part 58 of the boss part 55 are formed in the casting material 34' through machining. The side surface 78, and so on, connected to the outer surface 75 of the guide attachment part 39 is formed during the casting. In the connecting contour part 42, a portion between the arm part 38b of the side surface part 44b and the boss part 55 connected to the outer surface 75 of the guide attachment part 39 is formed during the casting.

Therefore, the outer surface 75 of the guide attachment part 39 is formed during the casting. The proximal end surface 70 and the curved surface 71 of the one arm part 38b connected to the connecting surface 76 of the outer surface 75, a portion between the arm part 38b of the side surface part 44b and the boss part 55, and the side surface 78 of the boss part 55 are also formed during the casting. That is, a boundary portion with no step difference between the guide attachment part 39 and the one arm part 38b and a boundary portion with no step difference between the guide attachment part 39 and the cylinder part 35 including the boss part 55 are all formed during the casting. In other words, the connecting surface 76 constituting the entire range of the connection portion to the cylinder part 35 and the one arm part 38b in the outer surface 75 of the guide attachment part 39 is formed to be connected to the cylinder part 35 and the one arm part 38b with no step difference through the casting. In addition, a parting line PL of the mold used during the casting of the casting material 34' is shown in a two-dot chain line of FIG. 6. It will be appreciated from the parting line PL that the connecting surface 76 to the outer surface 75 of the guide attachment part 39, the arm part 38b on a side of the connecting surface 76, the side surface part 44b on a side of the connecting surface 76, and the boss part 55 on a side of the connecting surface 76 are formed during the casting.

Figure 6:
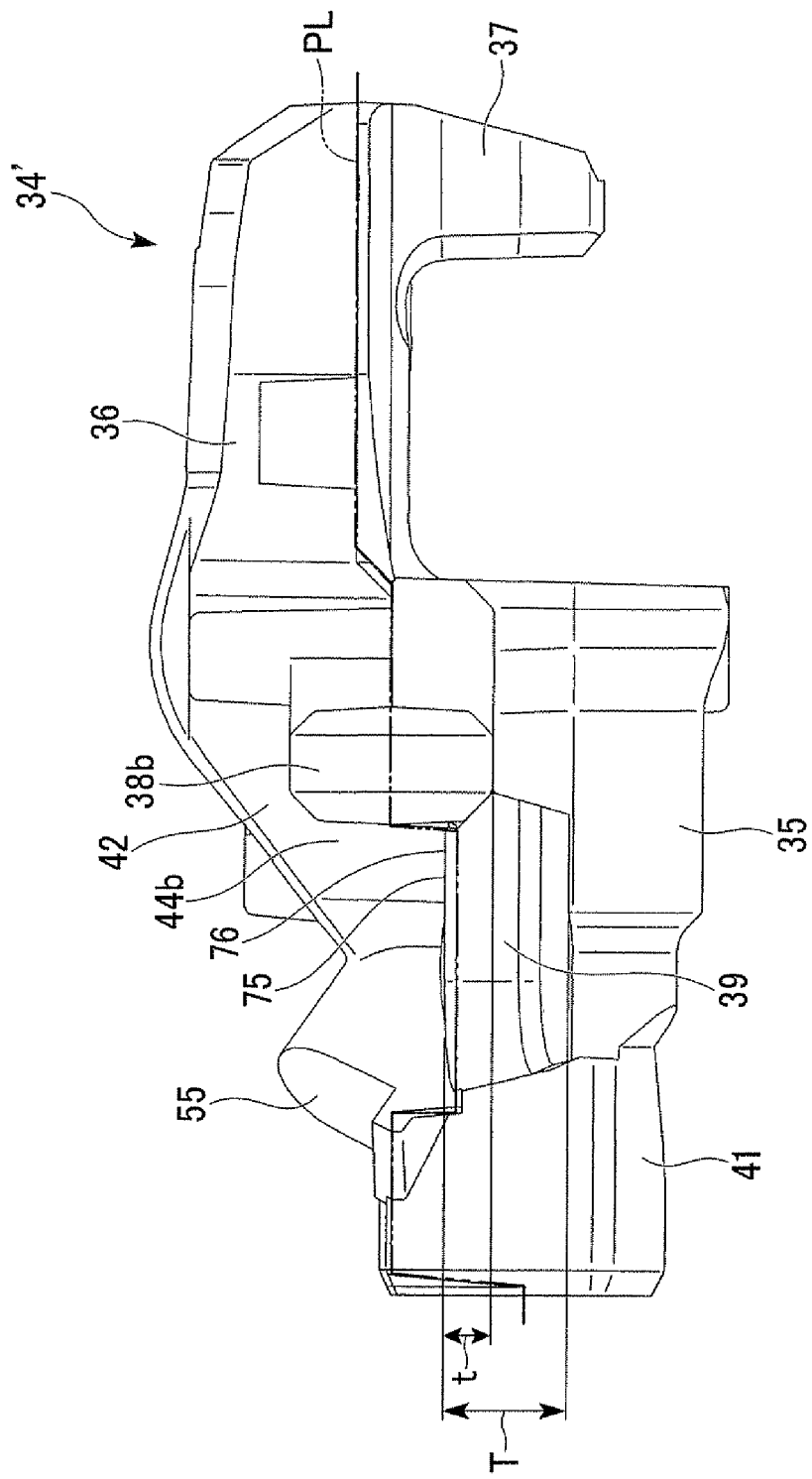
FIG. 6 is a side view showing a casting element of a caliper body of the disk brake in accordance with the embodiment of the present invention.
Figure 7:
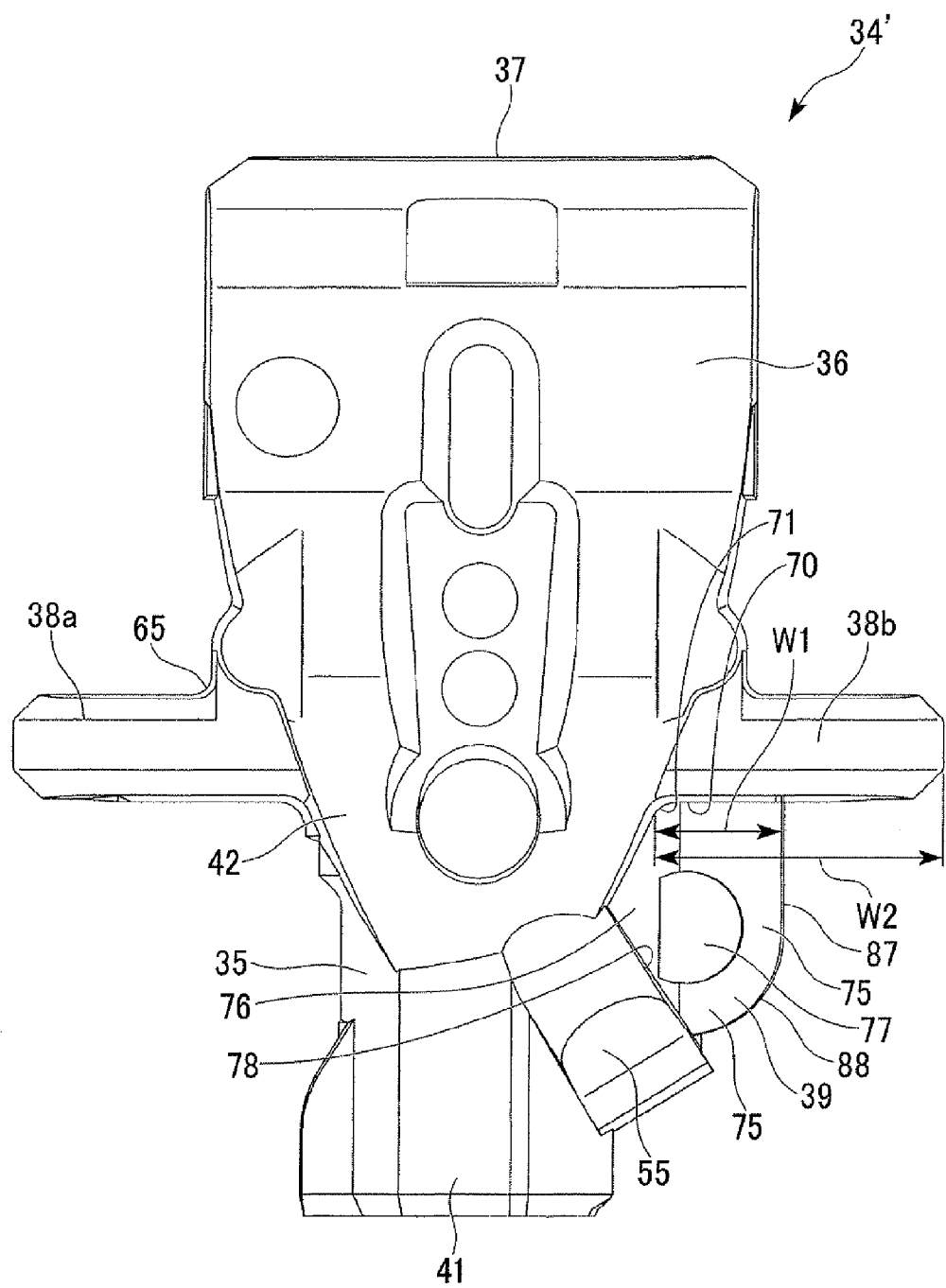
FIG. 7 is a plan view showing the casting element of the caliper body of the disk brake in accordance with the embodiment of the present invention.
Figure 8:
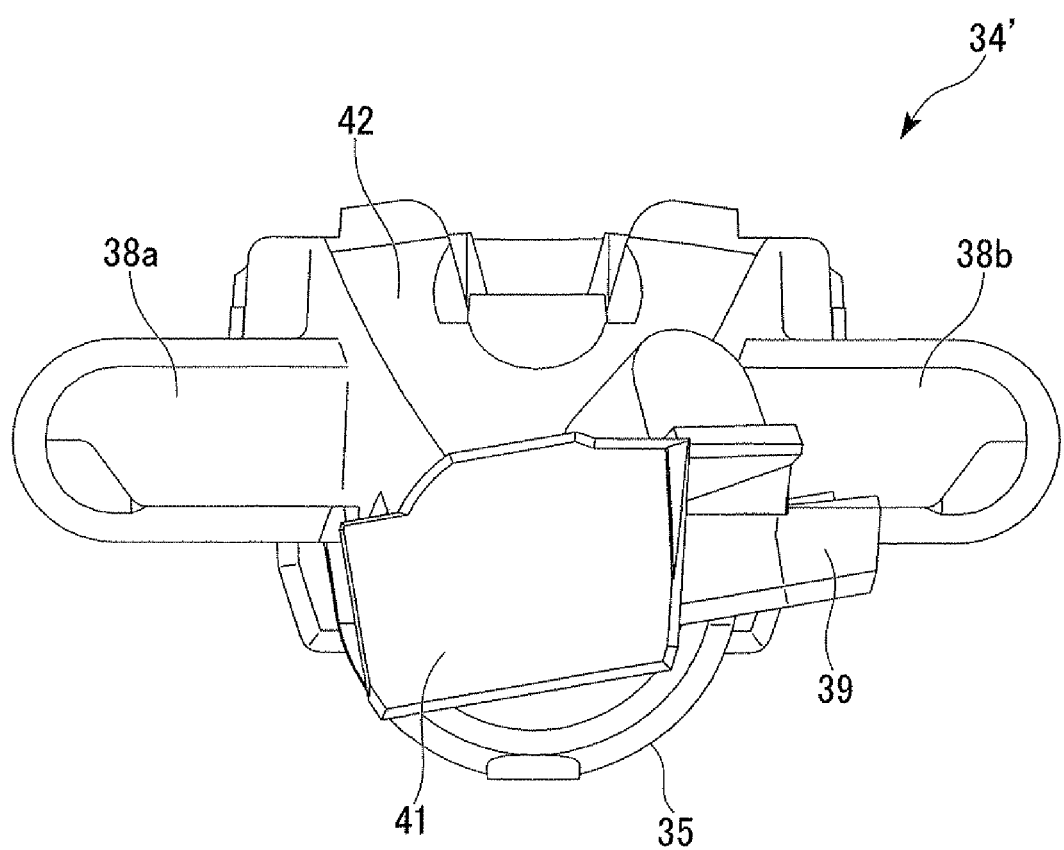
FIG. 8 is a rear view showing the casting element of the caliper body of the disk brake in accordance with the embodiment of the present invention.
Figure 9:
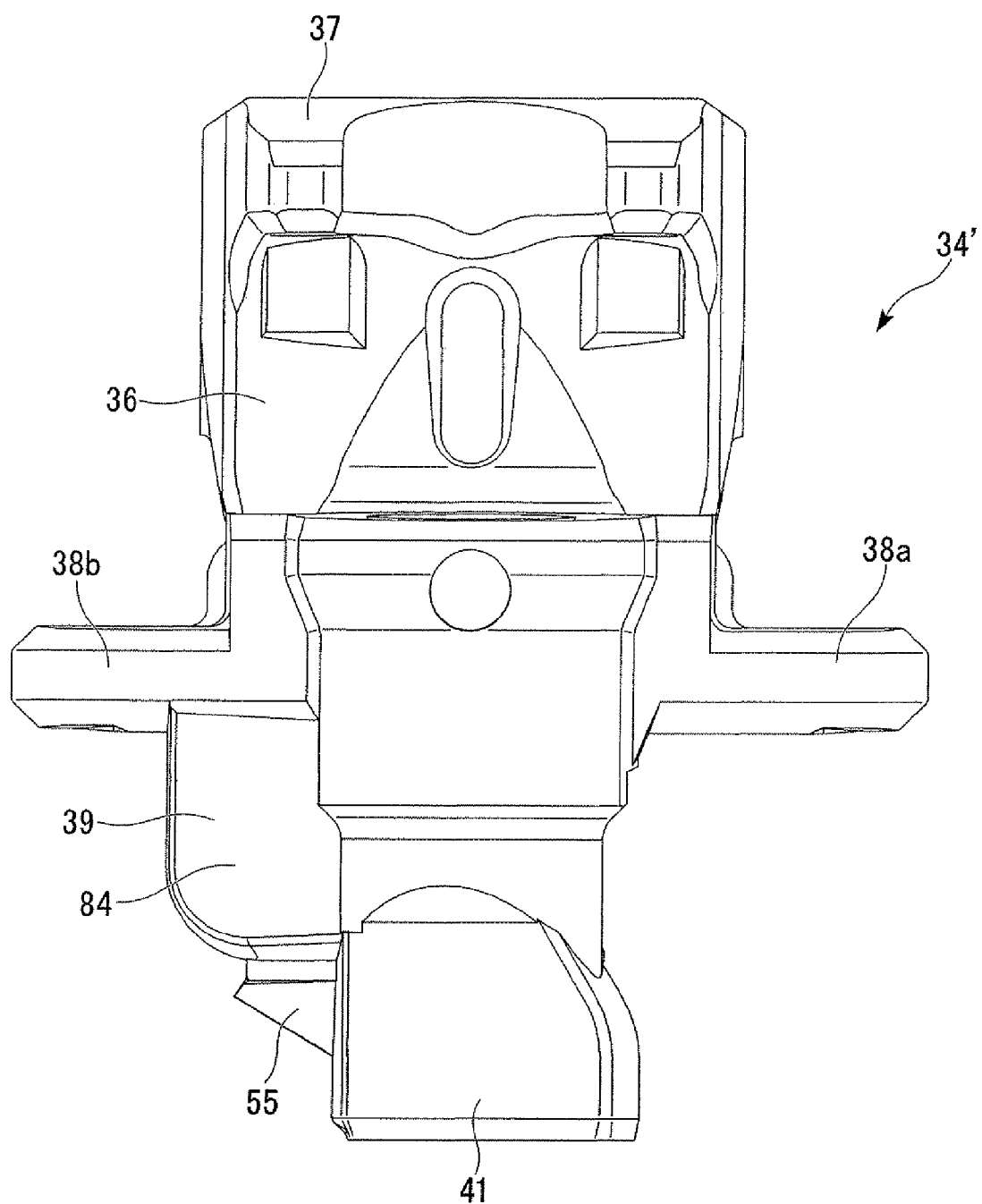
FIG. 9 is a bottom view showing the casting element of the caliper body of the disk brake in accordance with the embodiment of the present invention.

As shown in FIG. 6, the guide attachment part 39 has a thickness T in the disk diameter direction, ¼ or more of which is an "overlapping thickness t" overlapping the one arm part 38b. As shown in FIG. 7, an adhesion dimension W1 of the guide attachment part 39 with the one arm part 38b in the disk rotational direction is ½ or less of a dimension W2 of the one arm part 38b in the disk rotational direction.

Figure 10:
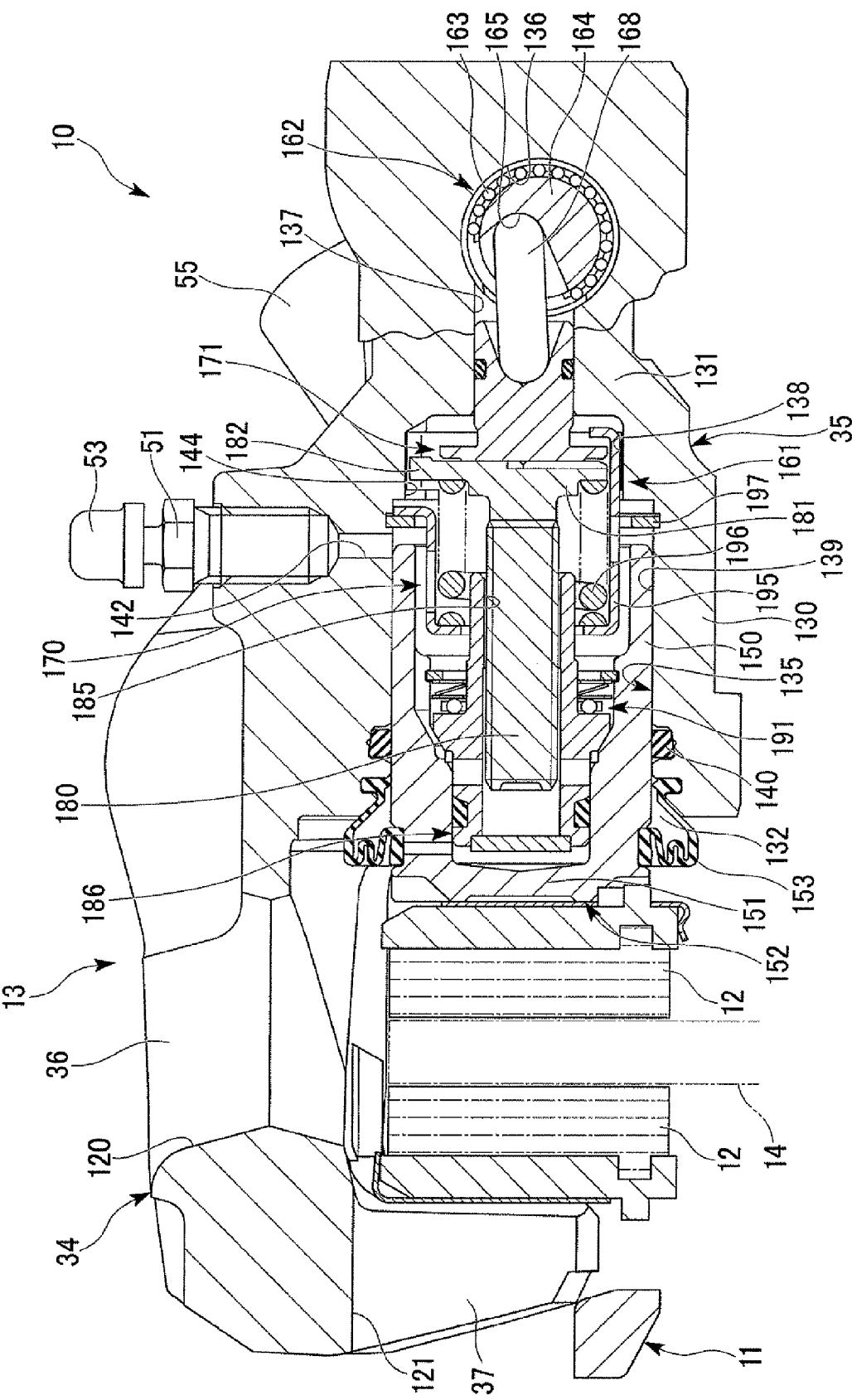
FIG. 10 is a side cross-sectional view showing the disk brake in accordance with the embodiment of the present invention.

As shown in FIG. 10, the cylinder part 35 of the caliper body 34 has a bottomed tube shape with a tubular cylinder tube part 130 and a cylinder bottom part 131 closing one end of the cylinder tube part 130 in an axial direction thereof. In addition, the cylinder part 35 has a bottomed tube shape in which a cylinder opening 132 oppose to the inner-side friction pad 12. Here, the inner circumference and the bottom surface of the cylinder tube part 130 are referred to as a bore 135.

A cam hole 136 having a circular cross-section is formed in the cylinder bottom part 131 of the caliper body 34 to be spaced apart from the bottom surface of the bore 135 in a direction perpendicular to the axial direction of the cylinder part 35. In addition, a bottom hole 137 is formed in the cylinder bottom part 131 passing from a center position of the bottom surface through to the cam hole 136 in the axial direction of the cylinder part 35.

An inner side hole 138 is concentrically formed in the inner circumference of the bore 135 of the cylinder tube part 130 of the caliper body 34 and most adjacent to the cylinder bottom part 131. In the inner circumference of the bore 135 of the cylinder tube part 130 of the caliper body 34, a sliding hole 139 having a diameter larger than that of the inner side hole 138 is formed concentrically with respect to the inner side hole 138 to be adjacent to the cylinder opening 132, rather than the inner side hole 138. A piston seal 140 configured to seal a gap with a piston 152, which will be described later, is fixed adjacent to an end of the sliding hole 139 opposite to the inner side hole 138.

A bleeder hole 142 is formed in the cylinder tube part 130 of the caliper body 34 to be opened toward the cylinder bottom part 131, rather than the holding position of the piston seal 140 of the sliding hole 139. The bleeder hole 142 is formed to pass through the cylinder tube part 130 to be opened toward the bridge part 36 in the disk diameter direction. The mouthpiece 51 is attached to an opened position of the bleeder hole 142.

An axial groove 144 having a concave shape is formed in the inner circumference of the inner side hole 138 of the cylinder tube part 130 to be recessed in a radial direction thereof to extend in the axial direction.

The caliper 13 has a lidded tubular piston 152 having a cylindrical tube part 150 and the circular disk-shaped lid part 151. The piston 152 is housed in the bore 135 formed in the cylinder part 35 of the caliper body 34 in a posture in which the tube part 150 is directed to the cylinder bottom part 131. Specifically, the piston 152 is slidably inserted into the sliding hole 139 of the bore 135.

A flexible boot 153 is provided between the inner circumference of the cylinder part 35 adjacent to the cylinder opening 132 and the outer circumference of the piston 152 adjacent to the lid part 151 to cover a gap between the piston 152 and the cylinder part 35 from the outside.

The caliper 13 slides the piston 152 in the sliding hole 139 of the cylinder part 35 using a brake liquid pressure introduced between the cylinder part 35 and the piston 152 through the introduction hole 56 to project the piston 152 from the cylinder part 35 toward the friction pad 12. Accordingly, the piston 152 and the claw part 37 grip the pair of friction pads 12 from both sides thereof to press the friction pads 12 against the circular disk 14.

The piston 152 slides in the cylinder part 35 to project from the cylinder part 35 toward the claw part 37 using a pressure of the brake liquid introduced into the cylinder part 35 from a master cylinder (not shown) upon a normal brake operation by a stepping operation of the brake pedal. Accordingly, the pair of friction pads 12 contacts the disk 14 to generate a brake force. Meanwhile, a parking brake mechanism 161 is disposed in the cylinder part 35 of the caliper 13. The parking brake mechanism 161 presses the pair of friction pads 12 against the disk 14 to generate a brake force by mechanically pushing the piston 152 disposed in the caliper 13, rather than the brake liquid pressure, generating a brake force.

The parking brake mechanism 161 includes a cam mechanism 162 and a direct-acting transmission mechanism 170. The cam mechanism 162 includes an arc-shaped bearing 163 fitted into the cam hole 136 of the caliper body 34, and a substantially circumferential cam body 164 rotatably supported by the cam hole 136 through the bearing 163. A cam concave part 165 having a substantial V shape is formed in the cam body 164 from an outer circumference in the radial direction toward a center thereof. The most recessed portion of the cam concave part 165 is offset with respect to a center axis of the cam body 164.

The cam mechanism 162 includes a cam rod 168 having one end inserted into the cam concave part 165 and the other end disposed in the bottom hole 137. The cam rod 168 varies a projection amount from the cam body 164 according to a shape of the cam concave part 165 when the cam body 164 is rotated about an axis in a direction perpendicular to the shaft of the cylinder part 35. That is, since the bottom part of the cam concave part 165 is offset with respect to the center of the cam body 164, when the cam body 164 is rotated, a position of the bottom part is moved forward and backward with respect to the bottom hole 137 to vary the projection amount of the cam rod 168 in contact with the bottom part. The lever member 101 shown in FIG. 2 is fixed to a portion of the cam body 164 projecting from the cylinder part 35. The cam body 164 is rotated with the lever member 101 when the wire 110 is pulled to the cable 111 by a manual operation of a parking brake lever (not shown), a stepping operation of a parking brake pedal, and a motor operation of an electrically-driven cable puller to rotate the lever member 101. In other words, the lever member 101 transmits a force from the wire 110 to the parking brake mechanism 161.

As shown in FIG. 10, the direct-acting transmission mechanism 170 is installed in the cylinder part 35 to be pressed by the cam rod 168 of the cam mechanism 162 to move in the axial direction of the cylinder part 35. The direct-acting transmission mechanism 170 includes a push rod 171, a clutch member 186, and an adjustment part 191 configured to adjust positions of the push rod 171 and the clutch member 186. The direct-acting transmission mechanism 170 is configured as an assembly constituted by a cover member 195 and a push rod-biasing spring 196. In addition, the direct-acting transmission mechanism 170 is hooked to the cylinder part 35 by a C-shaped retaining ring 197 to restrict movement in the cylinder opening 132.

The push rod 171 includes a threaded shaft part 180 and a substantially circular plate-shaped flange part 181. In addition, a convex part 182 is integrally formed with the outer circumference of the flange part 181 to project outward in the radial direction. The convex part 182 is fitted into the axial groove 144 of the inner side hole 138 of the cylinder tube part 130 to restrict rotation of the push rod 171 with respect to the cylinder part 35.

The clutch member 186 has a female thread 185 threadedly engaged with the threaded shaft part 180 of the push rod 171.

In the disk brake 10 constituted as above, as the parking brake lever or the parking brake pedal (not shown) is operated, the wire 110 is pulled to rotate the cam mechanism 162, and the push rod 171 is pressed by the cam rod 168. The clutch member 186 is straightly moved in the axial direction by the pressing operation to forcedly slide the piston 152 in the cylinder part 35 toward the friction pads 12. In addition, the threaded shaft part 180 of the push rod 171 and the female thread 185 of the clutch member 186 have a clearance between the push rod 171 and the clutch member 186 to move a predetermined amount in the axial direction, without relative rotation therebetween.

Here, in the disk brake disclosed in Japanese Unexamined Patent Application, First Publication No.: 2005-291277, a mechanical parking brake mechanism is disposed in the caliper body formed of aluminum or an aluminum alloy. In the disk brake, the guide attachment part configured to attach the cable guide member solely projects from the caliper body. As a result, when the caliper body is cast, the guide attachment part may be particularly coagulated, a molten metal fluidity may be deteriorated, or formability of the caliper, in particular, the caliper body, may be deteriorated.

In comparison with this, according to the disk brake 10 of the embodiment, in the caliper body 34 in which the cylinder part 35 having the bore 135 configured to accommodate the piston 152, the pair of arm parts 38a and 38b extending from both sides of the cylinder part 35 in the disk rotational direction and having ends to which the sliding pins 30 are fixed, and the guide attachment part 39 configured to connect the one arm part 38b to the cylinder part 35 and to which the cable guide member 91 is fixed are integrally formed with each other, the thickness of the guide attachment part 39 in the disk diameter direction and the thickness of the arm part 38b in the disk diameter direction at least partially overlap in the disk axial direction. Accordingly, since the guide attachment part 39 and the arm part 38b are connected in the disk axial direction, the molten metal fluidity can be improved, and rapid coagulation of the guide attachment part 39 can be suppressed. As a result, casting formability of the caliper body 34 of the caliper 13 can be improved.

In addition, the thickness of the guide attachment part 39 in the disk diameter direction and the thickness of the arm part 38b in the disk diameter direction at least partially overlap in the disk axial direction. As a result, the parting line PL of the casting mold for casting the casting material 34' can be simplified. When the casting mold is a steel cast, mold release property upon separation of the casting mold can be improved, and when the mold is a sand cast, sands can be easily removed. In addition, it is possible to prevent generation of a step difference on the surface of the casting material 34' due to dislocation of the mold. In particular, when the step difference is formed at a connecting portion of the guide attachment part 39 and the arm part 38b, while the mold release property upon separation of the casting mold is deteriorated due to increase in surface in a casting mold separation direction, there is no deterioration in the embodiment, and thus, productivity can be improved. Further, since the parting line PL of the casting mold can be simplified, maintenance characteristics of the casting mold are also improved.

Furthermore, the thickness of the guide attachment part 39 in the disk diameter direction and the thickness of the arm part 38b in the disk diameter direction at least partially overlap in the disk axial direction. As a result, it is possible to obtain the strength of the guide attachment part 39 generating a stress through an input to the cable guide member 91 from the cable 111 and the arm part 38b generating a stress between the sliding pin 30 and the arm part 38b through an input upon a brake operation of the caliper 13. In addition, since the cylinder part 35 is connected to the arm part 38b through the guide attachment part 39, the strength of the cylinder part 35 can be increased.

In particular, since the one arm part 38b having the thickness in the disk diameter direction at least partially overlapping the thickness of the guide attachment part 39 in the disk diameter direction is the arm part having a larger clearance between the guide hole 29b and the sliding pin 30, vibrations may easily occur from the arm part 38b. As described above, it is possible to easily increase the strength of the arm part 38b, from which the vibrations may easily occur. That is, in the disk brake 10, in consideration of posture stabilization of the carrier 11 upon sliding movement, it is necessary to reduce the clearance between the guide hole 29a and the sliding pin 30 of the disk rotational inlet side. Meanwhile, even when the disk rotational outlet side of the carrier 11 is deformed due to application of a brake torque, in order to obtain sliding mobility of the caliper, it is necessary to increase the clearance between the guide hole 29b and the sliding pin 30 of the disk rotational outlet side of the carrier 11. As described above, as the arm part 38b of the disk rotational outlet side having the increased clearance is connected to the guide attachment part 39, the entire strength can be effectively increased.

When less than ¼ of the thickness T of the guide attachment part 39 in the disk diameter direction overlaps the one arm part 38b, reinforcement of the arm part 38b is insufficient, and thus, the strength cannot be easily increased to a substantially high level. However, since ¼ or more of the thickness T of the guide attachment part 39 in the disk diameter direction overlaps the one arm part 38b, the one arm part 38b can be more effectively reinforced by the guide attachment part 39 to substantially increase the strength.

When the adhesion dimension W1 of the guide attachment part 39 with the one arm part 38b in the disk rotational direction is larger than ½ of the dimension W2 of the one arm part 38b in the disk rotational direction, an influence on an increase in weight with respect to the strength improvement effect is increased. In the embodiment, the adhesion dimension W1 of the guide attachment part 39 with the one arm part 38b in the disk rotational direction is less than ½ of the dimension W2 of the one arm part 38b in the disk rotational direction. As a result, it is possible to suppress the influence on the increase in weight and effectively improve strength.

The boss part 55 having the introduction hole 56 configured to introduce a brake liquid into the caliper body 34 is formed at the cylinder part 35 of the caliper body 34 of the caliper 13, and the guide attachment part 39 is connected to the boss part 55. As a result, the strength of the cylinder part 35 including the boss part 55, the guide attachment part 39, and the arm part 38b can be further improved.

In addition, while the embodiment has exemplarily described the pair of pads 12, at least one pair of pads is sufficient, and of course, two or more pairs of pads 12 may be applicable.

According to the embodiment, the disk brake includes the caliper slidably supported at the attachment member by the sliding pins inserted into the guide holes formed in the attachment member fixed to the non-rotation part of the vehicle, the piston formed in the caliper and pressing at least the pair of friction pads against the disk, the parking brake mechanism disposed in the caliper to move the piston, the lever member configured to transmit a force from the wire to the parking brake mechanism, and the cable guide member integrally attached to the outside of the caliper and hooking the cable including the wire. The caliper includes a cylinder part disposed at one side in the disk axial direction and having a bore for accommodating the piston, the pair of arm parts extending to both sides of the cylinder part in the disk rotational direction and having ends to which the sliding pins are fixed, and the guide attachment part configured to connect the one side arm part of the pair of arm parts to the cylinder part and to which the cable guide member is fixed, which are integrally formed with each other. The thickness of the guide attachment part in the disk diameter direction and the thickness of the one arm part in the disk diameter direction at least partially overlap in the disk axial direction. Accordingly, the guide attachment part is connected to the one arm part in the disk axial direction. As a result, the molten metal fluidity can be improved, and rapid coagulation of the guide attachment part can be suppressed. Accordingly, formability of the casting of the caliper can be improved.

In addition, since the one arm part is the arm part having a large clearance between the guide hole and the sliding pin, the strength of the one arm part having the large clearance and from which the vibrations may easily occur can be effectively increased. Further, the clearances may be set to the same value at the disk rotational inlet side and the disk rotational outlet side, and the clearance of the other arm part side may be larger than that of the one arm side.

Furthermore, ¼ or more of the thickness of the guide attachment part in the disk diameter direction may overlap the one arm part. In this case, the one arm part can be more effectively reinforced to substantially increase the strength thereof by the guide attachment part. In addition, the overlapping of the thicknesses of the guide attachment part and the one arm part in the disk diameter direction can be less than ¼ of the thickness of the guide attachment part in the disk diameter direction as long as the overlapping does not disturb the molten metal fluidity upon casting of the caliper.

Further, the adhesion dimension of the guide attachment part in the disk rotational direction with the one arm part may be ½ or less of the dimension of the one arm in the disk rotational direction. In this case, the strength can be effectively improved while suppressing the influence on the increase in weight. Furthermore, in order to improve the strength, the adhesion dimension may be larger than ½ of the dimension of the one arm part in the disk rotational direction as long as the adhesion dimension does not disturb attachment of the sliding pin to the one arm part.

In addition, the boss part having the introduction hole for introducing a brake liquid into the caliper may be formed at the cylinder part of the caliper, and the guide attachment part may be coupled to the boss part. In this case, the strength of the cylinder part including the boss part, the guide attachment part and the one arm part can be further improved. Further, it is not necessary for the guide attachment part to be coupled to the boss part.

While the invention has been shown and described with reference to certain example embodiments thereof, it will be understood by those skilled in the art that various changes, additions, omissions, substitutions, and other modifications in configurations may be made therein without departing from the spirit and scope of the invention as defined by the appended claims.

What is claimed is:

1. A disk brake comprising:
   a caliper slidably supported at an attachment member by sliding pins inserted into guide holes formed in the attachment member fixed to a non-rotation part of a vehicle;
   a piston disposed in the caliper and configured to press at least a pair of friction pads against a disk;
   a parking brake mechanism disposed in the caliper to move the piston;
   a lever member configured to transmit a force from a wire to the parking brake mechanism; and
   a cable guide member integrally attached to an outer side of the caliper and configured to hook a cable including the wire,
   wherein the caliper comprises:
   a cylinder part disposed at one side in a disk axial direction and having a bore for accommodating the piston;
   a pair of arm parts extending to both sides of the cylinder part in a disk rotational direction and having ends to which the sliding pins are fixed; and
   a guide attachment part configured to connect one arm part of the pair of arm parts to the cylinder part and to which the cable guide member is fixed,
   wherein the cylinder part, the pair of arm parts and the guide attachment part are integrally formed with each other, and
   wherein a thickness of the guide attachment part in a disk diameter direction and a thickness of the one arm part in the disk diameter direction at least partially overlap in the disk axial direction.

2. The disk brake according to claim 1, wherein the one arm part is an arm part having a large clearance between the guide hole and the sliding pin.

3. The disk brake according to claim 1, wherein the one arm part is an arm part that becomes a disk rotational outlet side when the vehicle moves forward.

4. The disk brake according to claim 1, wherein ¼ or more of the thickness of the guide attachment part in the disk diameter direction overlaps the one arm part.

5. The disk brake according to claim 1, wherein an adhesion dimension of the guide attachment part with the one arm part in the disk rotational direction is equal to or less than ½ of a dimension of the one arm part in the disk rotational direction.

6. The disk brake according to claim 1, wherein a boss part having an introduction hole for introducing a brake liquid into the caliper is formed at the cylinder part of the caliper, and the guide attachment part is connected to the boss part.

7. The disk brake according to claim 1, wherein the caliper is integrally formed of an aluminum alloy through casting.

8. The disk brake according to claim 1, wherein the guide attachment part is formed to project one side in the disk rotational direction.

9. A disk brake comprising:
   a caliper slidably supported at an attachment member fixed to a non-rotation part of a vehicle and having a piston disposed therein to press a friction pad against a disk;
   a parking brake mechanism disposed in the caliper to move the piston; and
   a cable guide member attached to an outer side of the caliper and configured to hook a cable including a wire for transmitting a force to the parking brake mechanism,
   wherein the caliper comprises:
   a cylinder part disposed at one side in a disk axial direction and having a bore for accommodating the piston;
   a pair of arm parts extending to both sides of the cylinder part in a disk rotational direction, and having sliding parts formed at ends thereof and moving with respect to the attachment part; and
   a guide attachment part configured to connect one arm part of the pair of arm parts to the cylinder part and to which the cable guide member is fixed,
   wherein the cylinder part, the pair of arm parts and the guide attachment part are integrally formed of an aluminum alloy through casting, and
   wherein ¼ or more of a thickness of the guide attachment part in a disk diameter direction overlaps a thickness of the one arm part in the disk diameter direction.

10. The disk brake according to claim 9, wherein the one arm part is an arm part having a large clearance between the guide hole and the sliding part.

11. The disk brake according to claim 9, wherein the one arm part is an arm part that becomes a disk rotational outlet side when the vehicle moves forward.

12. The disk brake according to claim 9, wherein an adhesion dimension of the guide attachment part with the one arm part in the disk rotational direction is equal to or less than ½ of a dimension of the one arm part in the disk rotational direction.

13. The disk brake according to claim 9, wherein a boss part having an introduction hole for introducing a brake liquid into the caliper is formed at the cylinder part of the caliper, and the guide attachment part is connected to the boss part.

14. The disk brake according to claim 9, wherein the guide attachment part is formed to project one side in the disk rotational direction.

15. A disk brake comprising a caliper slidably supported at an attachment member by sliding pins inserted into guide holes formed in the attachment member fixed to a non-rotation part of a vehicle, and to which a cable guide member configured to hook a cable including a wire for transmitting a force to a parking brake mechanism to move a piston is attached, wherein the caliper comprises:
a cylinder part disposed at one side in a disk axial direction and having a bore for accommodating the piston;
a pair of arm parts extending to both sides of the cylinder part in a disk rotational direction and having ends to which the sliding pins are fixed; and
a guide attachment part configured to connect one arm part of the pair of arm parts that becomes a disk rotational outlet side when the vehicles moves forward to the cylinder part and to which the cable guide member is fixed,
wherein the cylinder part, the pair of art parts and the guide attachment part are integrally formed with each other, and wherein an adhesion dimension of the guide attachment part with the one arm part in the disk rotational direction is equal to or less than ½ of a dimension of the one arm part in the disk rotational direction.

16. The disk brake according to claim 15, wherein the one arm part that becomes the disk rotational outlet side is an arm part having a large clearance between the guide hole and the sliding pin.

17. The disk brake according to claim 15, wherein ¼ or more of a thickness of the guide attachment part in a disk diameter direction overlaps a thickness of the one arm part in the disk diameter direction.

18. The disk brake according to claim 15, wherein a boss part having an introduction hole for introducing a brake liquid into the caliper is formed at the cylinder part of the caliper, and the guide attachment part is connected to the boss part.

19. The disk brake according to claim 15, wherein the caliper is integrally formed of an aluminum alloy through casting.

20. The disk brake according to claim 15, wherein the guide attachment part is formed to project one side in the disk rotational direction.

* * * * *